June 13, 1961 R. RANKL 2,988,080
VALVE
Filed April 13, 1959

INVENTOR
Radomir Rankl

BY Michael S. Striker
ATTORNEY

United States Patent Office 2,988,080
Patented June 13, 1961

2,988,080
VALVE
Radomir Rankl, Graz, Austria, assignor to
Hans List, Graz, Austria
Filed Apr. 13, 1959, Ser. No. 805,811
Claims priority, application Austria Apr. 12, 1958
8 Claims. (Cl. 123—188)

The present invention relates to valves in general, and more particularly to improvements in inlet valves for gaseous fuel burning engines and the like.

As is known, the explosive mixture of air with a gaseous fuel has an upper and a lower limit, and the range between such limits varies with the nature of the gaseous fuel. When the engine is subjected to varying loads, not only the quantity of air but also the quantity of gaseous fuel must be adjusted in the fuel-air mixture in order to maintain the latter within the aforementioned limits, i.e. the mixture should not be too lean or too rich if satisfactory ignition is to be insured. Thus, the quantities of air and gaseous fuel in the explosive mixture require rather accurate adjustment. Such quantitative regulation of air and gaseous fuel in the mixture prevents misfiring known as hit-and-miss operation of the engine.

Quantitative regulation of both components in the fuel-air mixture becomes more critical as the load upon the engine decreases because, under such operating conditions, comparatively small changes in the amount of admixed gaseous medium may lead to an overly rich or excessively lean mixture and, consequently, may exceed the upper or the lower limit of satisfactory ignition range.

Presently utilized valve actuating systems, whether of the mechanical or of the hydraulic type, share the common disadvantage consisting in that they bring about changes in the throw or stroke of the valve or valves which they control even if all valves were originally adjusted in identical fashion. When a mechanical valve control is applied, i.e. when any one of so-called valve gears is utilized, the differences in the valve throw are brought about by the unavoidable play in the link train, gears and other articulatable or rotary motion-transferring components of the valve gear. In a hydraulic valve actuating system, the variations in valve throw are caused in part by the compressibility and in part by the leakage of the pressure medium. Such differences in the stroke or throw of various known valves are particularly felt when it is desired that the valves should permit flow of comparatively small quantities of fluid therethrough, e.g. when an engine utilizing gaseous fuel operates under reduced load. Under such operating conditions, comparatively small fluctuations in the quantity of admitted fluid, e.g. a gaseous fuel or air, brought about by uneven strokes of inlet valves, may cause the fuel-air mixture to exceed either the upper or the lower ignition limit resulting in undesirable hit-and-miss operation of the engine.

It is an important object of the present invention to provide an improved valve which is particularly suitable for controlling the flow of gaseous media and which is so constructed as to be especially sensitive and accurate when called to control the flow of relatively small fluid quantities, i.e. when it is in partly open or nearly closed position.

Another object of the invention is to provide an improved valve assembly which is capable of accurately controlling the quantities of a passing fluid medium even if the valve actuating mechanism operates with considerable play, i.e. even if the valve throw varies within rather wide limits.

A further object of the invention is to provide an improved valve of the above outlined character which may be utilized in place of presently known poppet valves in nearly all types of gas engines and like apparatus.

A still further object of the present invention is to provide an improved inlet valve for controlling the entry of air and gaseous fuel into the combustion chambers of internal combustion engines which is capable of accurately conforming to changes in the load upon and in the output of such engines.

Still another object of the invention is to provide a valve for use in fuel burning engines which is capable of accurately controlling the flow of a fluid medium under constant load conditions regardless of small or even considerable play in the operation of a hydraulic or mechanical valve actuating mechanism.

A yet further object of the invention is to provide an improved valve which is capable of accurately controlling the flow of a fluid medium under widely different temperature conditions, i.e. which can be utilized for controlling the flow of gases with widely different calorific values.

An additional object of the invention is to provide a valve of the above outlined character which is so constructed as to assist the mixing of a fluid medium whose flow it controls with the fluid already contained in the space into which the controlled fluid medium is led.

A further object of the present invention is to provide an improved valve which is capable of reducing a fluid stream into a plurality of individual jets to insure better intermixing of the controlled fluid with another fluid.

A yet further object of the invention is to provide a valve which is capable of imparting a twist or spin to the controlled fluid medium.

A concomitant object of the invention is to provide a valve of the above outlined character which is of extremely simple and light weight construction, and which is particularly suitable for continuous operation at high rates of speed and under widely different temperature conditions.

An additional object of the invention is to provide a valve which is constructed with a view to accurately control the flow of minute quantities of conveyed fluid when in slightly open position, and to permit unrestricted flow of fluid when moved into nearly or fully open position.

A further object of the invention is to provide a valve which may be readily manufactured in conventional machine tools.

The above and certain other objects of the invention are attained by the provision of a valve which is operated in a manner similar to that of a poppet valve save for the provision of a flow restricting member which is connected to the valve head, is coaxial with the valve stem, and is formed with a plurality of channels whose dimensions diminish at least in those zones thereof which are closer to the valve head. When the valve is in fully closed position, the flow restricting member extends into the bore of the valve housing but is received therein with a preferably slight tolerance. The cross-sectional areas of the channels are so selected that, in fully open position of the valve, predetermined maximum quantities of fluid can pass through the valve housing to be discharged between the seat in the housing and the face or side of the valve head. However, when the valve is in only slightly open position, the major quantity of controlled fluid passes through the gradually diminishing or tapering portions of the channels; therefore, any changes in the flow of fluid are gradual even if the valve throw should change in each subsequent operation of the valve actuating system. In other words, though the valve may be actuated by a mechanical but preferably hydraulic device operating with a certain play, the difference in valve stroke or throw when the head is moved between fully closed and partly open positions will not overly affect the quantity of a fluid medium whose flow through the bore of a valve housing is controlled by a so constructed valve. Thus, in contrast to presently utilized poppet type valves, for example, those known as mushroom or tulip valves, in which comparatively small changes in the throw bring about great fluctuations in the quantity of controlled fluid, the novel valve is particularly sensitive and accurate when small quantities are permitted to pass through the diminishing zones of channels provided in its flow restricting member.

Another important consideration in calculating the cross-sectional areas of aforementioned channels of the flow restricting member is that, when the assembly of a valve housing and of the novel valve is utilized in a gaseous fuel burning engine and the valve is in fully open position, it should permit full-load operation of the engine even if the calorific value of the utilized fuel is very low. When so dimensioned, the valve can be utilized in connection with fuels of higher calorific value since, being capable of accurately controlling the flow of fuels having low calorific value, its control of fuels whose calorific value is higher, too, is especially satisfactory. Thus, by utilizing the novel valve with suitably dimensioned channels, the ignition limits of a fuel-air mixture controlled thereby will not be exceeded.

The flow restricting member may assume the shape of a conical, cylindrical, or partly conical and partly cylindrical boss which constitutes an enlarged end portion of the valve stem, or the flow restricting member may be formed as a preferably thin-walled, substantially cylindrical skirt extending away from and surrounded by the sealing face of the valve head, coaxially surrounding the stem, and being formed with cutouts diminishing in a direction toward and terminating close to the valve head. When the flow restricting member constitutes a reinforced end portion or boss of the valve stem, the channels are formed in its periphery and at least that zone of each channel which is close to the valve head diminishes in cross-sectional area in the direction away from the stem, i.e. toward the valve head.

The channels may be symmetric or asymmetric, axially parallel or helical, of different or identical configurations, and may be bounded by arcuate or arcuate and plane surfaces all depending upon whether certain additional effects of the novel valve upon the controlled fluid medium are desired, e.g. better intermixing of metered fluid with another fluid, a change in the direction of the fluid, etc.

If an especially accurate control of minute quantities of the metered fluid medium is desired, each channel in the flow restricting member may communicate with a channel or cutout of much smaller cross-sectional area, such smaller channels being formed in a cylindrical portion of the valve intermediate its head and the adjacent end of the flow restricting member and also extending into the latter's body. The cylindrical portion is then slidably received in the bore of the valve housing when the valve is in closed position and, when the valve is opened only to such an extent as to expose a fraction of or the entire peripheral zone of the aforementioned cylindrical portion, very small quantities of fluid may be discharged through such small channels. As soon as the throw of the valve increases, the larger channels, too, will become exposed in partly or fully open position of the valve, but the flow of fluid still increases only gradually due to the decrease in cross-sectional areas of the larger channels.

The novel features which are considered as characteristic for the invention are set forth in particular in the appended claims. The invention itself, however, both as to its construction and its method of operation, together with additional objects and advantages thereof, will be best understood from the following description of certain specific embodiments when read in connection with the accompanying drawing, in which:

Figure 1:
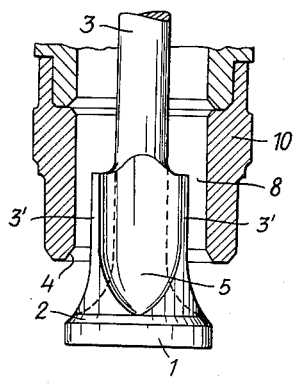
FIG. 1 illustrates in central section a valve cylinder or housing and in elevation one form of the novel valve in fully open position, the stem of this valve terminating in a partially conical flow restricting member or boss formed with four axially parallel and comparatively wide channels.
Figure 2:
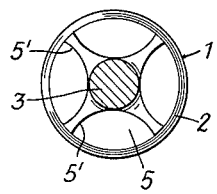
FIG. 2 is top plan view of the valve shown in FIG. 1.

Referring now in greater detail to the illustrated embodiments, and first to the valve assembly shown in FIGS. 1 and 2, the reciprocable component or valve comprises a discoid head 1 having an annular sealing face 2 which is of conical shape and tapers inwardly in a direction toward the stem 3. Head 1 is connected with stem 3 by a coaxial flow restricting member or boss 3' whose periphery is formed with four symmetrically distributed and substantially axially parallel recesses or cutouts 5 constituting channels through which the fluid can pass when the face 2 of head 1 is at least slightly spaced from its seat 4 formed in the stationary component formed as a valve cylinder or housing 10. The latter has a coaxial bore into which the stem 3 and its boss 3' extend. As is best shown in FIG. 2, each channel 5 is bounded by an arcuate surface 5', and a portion of each channel 5 tapers or diminishes in depth and in width in a direction from the stem 3 toward the face 2 of head 1. As is also shown in FIG. 2, the open ends of channels 5 in that end of boss 3' which is distant from head 1 are of such depth that their innermost points contact the periphery of a circle corresponding in diameter to that of stem 3.

The radius of the boss or flow restricting member 3' preferably approximates the maximum stroke or throw of the valve, i.e. it approximates the distance covered by the valve head 1 between its one extreme position shown in FIG. 1 in which the valve is fully open, and the other extreme position in which the side or face 2 is in sealing contact with its seat 4 in the cylinder or housing 10. It will be noted that the diameter of boss 3' is slightly smaller than that of the bore 8, i.e. boss 3' is not in sliding contact with the cylinder 10. Also, the depth and width of channels 5 and hence the cross-sectional area of each channel 5 diminishes in a direction toward a respective central point adjacent to the smaller-diameter end of sealing face 2 on valve head 1.

The channels 5 in flow restricting member 3' may assume a number of different shapes other than those shown in FIG. 2. However, if these channels are bounded by arcuate surfaces, the valve may be manufactured at a very low cost in known machine tools. For example, a milling cutter of circular contour with a diameter corresponding to that of an arcuate surface 5' is led in a direction from the stem 3 toward the head 1 and into the body of boss 3' in such manner as to continuously increase its distance from the axis of stem 3 whereby the depth and width of a so-formed channel 5 decrease accordingly. The maximum cross-sectional area of each channel is determined by the diameter of the cutting tool.

If the valve assembly shown in FIG. 1 is utilized to introduce controlled quantities of a gaseous fuel into the cylinder of an internal combustion engine, the number and the cross-sectional areas of channels 5 are so calculated that the valve permits the flow of requisite maximum fuel quantities when in fully open position. On the other hand, if the valve reciprocates only between its closed and a slightly open position, i.e. a slightly open position in which the face 2 is so close to the seat 4 that the reduced end zones of channels 5 convey the major part of a fluid into the space below the valve housing 10, even considerable variations in the length of successive throws of valve stem 3 will only insignificantly change the quantity of conveyed fluid since the changes in the cross-sectional areas of channels 5 adjacent to the sealing face 2 are gradual. In other words, the novel valve insures progressive or gradual rather than sudden increase in the quantity of introduced fluid while moving from closed into slightly open and thereupon into fully open position. Consequently, any inaccuracies in the throw of the improved valve between sealing and slightly open positions, i.e. in the operation of the valve actuating mechanism, do not overly affect the amounts of metered fluid medium. It is to be noted that the improved valve is preferably, but not necessarily, operated by hydraulic means.

Figure 3:
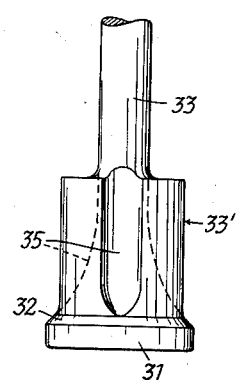
FIG. 3 is elevational view of a modified valve whose stem terminates in a substantially cylindrical boss formed with uniformly spaced and somewhat narrower channels.
Figure 4:
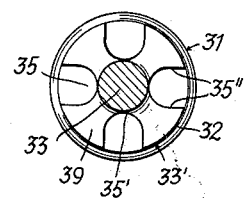
FIG. 4 is top plan view of the valve shown in FIG. 3.

The device shown in FIGS. 3 and 4 comprises a discoid head 31 which is connected with stem 3 by a coaxial cylindrical boss or flow restricting member 33' whose diameter also remains unchanged all the way to the conical sealing face 32. The four channels 35 are somewhat narrower, i.e. they are separated by comparatively wide webs 39, and each channel 35 is bounded by an arcuate, preferably circular, surface 35' and by a pair of parallel surfaces 35'' constituting extensions of surface 35' and extending nearly radially outwardly toward the periphery or mantle of boss 33'. Otherwise, the configuration of channels 35 is quite similar to that of channels 5 shown in FIGS. 1 and 2, i.e. their cross-sectional areas decrease gradually at least in that peripheral portion of boss 33' which is close to the conical face 32.

Figure 5:
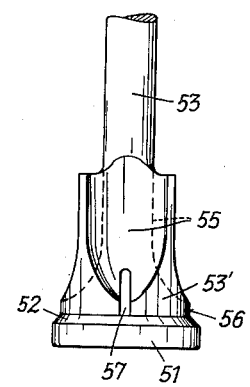
FIG. 5 shows in elevational view a further modification of the valve according to which the boss is formed with two sets of channels.
Figure 6:
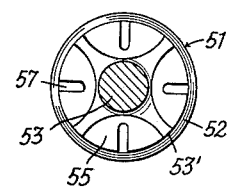
FIG. 6 is a top plan view of the valve shown in FIG. 5.

The valve shown in FIGS. 5 and 6 is formed with a boss 53' identical with the boss 3' of the valve shown in FIGS. 1 and 2. However, the channels 55 formed in the flow restricting member 53' do not terminate at the conical face 52 but are separated therefrom by a short cylinder 56. Thus, the valve consists of a head 51, of a boss 53' including the major portion formed with the channels 55 and a shorter cylindrical portion 56 whose diameter equals the smallest diameter of conical face 52 and approximates the diameter of the bore in the valve housing. The channels 55 in boss 53' decrease in depth and width toward and terminate at the cylinder 56. Each of these channels communicates with a comparatively narrow radial cutout or slot 57 formed in the cylinder 56 and extending into the body of boss 53'.

As before stated, the diameter of cylinder 56 preferably approximates the diameter of the bore 8 in valve cylinder 10. Thus, even if the cylinder 56 of the valve shown in FIGS. 5 and 6 is slidably guided in the valve housing 10, relatively small and fully controlled quantities of a fluid may pass through the channels 55 and through cutouts or small channels 57 which latter communicate with channels 55. If desired, at least the depth of cutouts 57, too, may taper or diminish in the direction toward the valve head 51. The diameter of boss 55 is preferably midway between the diameters of stem 53 and of cylindrical portion 56, respectively. As already explained in connection with FIG. 1, the diameters of the bosses and the configuration of the channels and cutouts therein are so selected that a predetermined maximum quantity of fluid may pass between the face of the valve head and the seat of the valve housing when the valve is fully open, i.e. when the novel valve is in the position corresponding to that of the valve shown in FIG. 1.

The construction of the valve shown in FIGS. 5 and 6 allows for even more accurate metering or dosing of conveyed fluid when the valve is only slightly open. Thus, when the cylinder 56 is slidably received without or with comparatively small play in the bore of the valve housing, the sole discharge route for the fluid is through small cutouts or channels 57. If the stroke of the valve increases to such an extent that, in partly open position, the cylinder 56 is moved away from its bore in the valve housing, the fluid medium is free to escape through the progressively diminishing end zones of channels 55, i.e. the valve of FIGS. 5 and 6 then operates as that shown in FIG. 1 or 3. It will be seen that, by providing two sets of communicatively connected channels 55, 57 of widely different cross-section areas, additional quantitative control of fluid flow may be achieved in partly open and nearly closed position of a so constructed valve.

Figure 7:
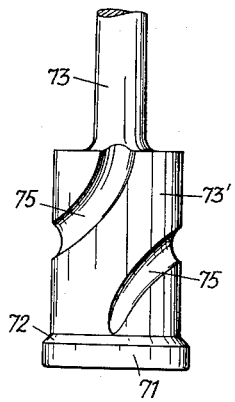
FIG. 7 is elevational view of a valve similar to that shown in FIG. 2, but with helically arranged channels in the boss.

Referring now to FIG. 7, there is shown a valve identical with that of FIG. 1, excepting that the periphery of boss 73' is formed with helical or spiral grooves or channels 75. At least a portion of each channel 75 tapers or decreases in depth and in width in a direction toward the side or face 72 of valve head 71. Each channel 75 attains its maximum depth and width, i.e. its maximum cross-sectional area, at a point adjacent to the valve stem 73, that is, at the end of boss 73' which is distant from the valve head 71. This construction is often preferred because the fluid passing through helical grooves or channels 75 is caused to enter into the space receiving the head 71 in desired directions and is more likely to thoroughly mix with the fluid already present in said space. Thus, the channels 75 cause the fluid passing therethrough to be discharged from the valve housing in the form of a hollow cylinder or a hollow cone which is often desirable in combustion chambers of certain turbines and other fuel burning engines. It can be said that inclined channels 75 impart a spin or twist to the individual streams or jets of the conveyed fluid medium.

Figure 8:
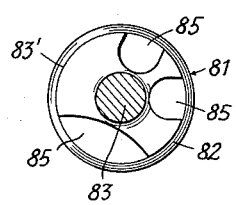
FIG. 8 is top plan view of a still further modification of the valve according to which the boss is formed with asymmetrically distributed channels.

In the embodiment of FIG. 8, the cylindrical boss 83' which connects the valve head 81 with stem 83 is formed with three channels 85 which are asymmetrically distributed in its mantle. In addition, one channel 85 differs not only in size but also in shape from the other two channels. As in the valves of FIGS. 1 to 7, at least a portion of each channel 85 tapers in width and depth in a direction toward the conical side or sealing face 82 of the valve head 81. This construction, too, is often preferred because the asymmetrically distributed channels or grooves 85 contribute to better mixing of the gaseous fuel, air or any other fluid discharged from the bore of the valve cylinder.

Figure 9:
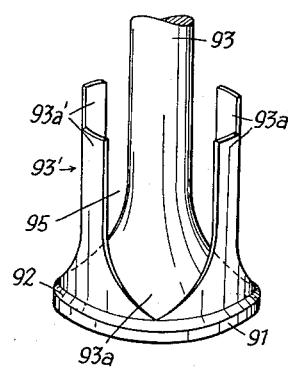
FIG. 9 shows in perspective view an additional modification of the valve whose flow restricting member consists of an apertured or channeled skirt extending from one side of the valve head.

FIG. 9 illustrates an additional modification of the improved valve which is formed with a substantially cylindrical thin-walled skirt or tubular flow restricting member 93' consisting of four symmetrically arranged sections or prongs 93a' separated by four substantially axially parallel channels or slots 95 whose width decreases in a direction toward the valve head 91 to which the prongs 93a' are connected. Thus, each slot has a pointed end adjacent to the sealing face 92. The stem 93 terminates in a conical portion 93a; this portion flares outwardly toward and is integrally united with the adjacent side of valve head 91. Thus, the valve of FIG. 9 is comparable to a so-called tulip valve but additionally comprises a substantially cylindrical skirt or flow restricting member 93' of a diameter somewhat smaller than the diameter of the bore into which the skirt and the valve stem 93 are inserted.

It will be noted that the valve shown in FIG. 9 is of extremely lightweight construction; therefore, it is particularly suitable for use in rapidly operating machines in which the valve must perform consecutive strokes at very short intervals. The thin-walled, slotted skirt 93', when compared with the bosses shown in preceding FIGS. 1–8, reduces the inertia of a so-constructed valve which renders it particularly suitable for high speed operation. Here, too, the radius of skirt 93' preferably approaches or equals the maximum length of the valve throw.

Without further analysis, the foregoing will so fully reveal the gist of the present invention that others can by applying current knowledge readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A valve comprising a head having a side; and a stem at said side of and coaxially connected with the head, said stem having a coaxial boss adjacent to the head, the boss having an end distant from said head, a periphery, and a plurality of channels in said periphery, said channels being asymmetrically distributed with respect to the axis of said stem and each channel extending from said end and diminishing in cross-sectional area in a direction toward and terminating at said head.

2. A valve comprising a head having a side; and a stem at said side of and coaxially connected with the head, said stem having a coaxial boss adjacent to the head, the boss having an end distant from said head, a periphery, and a plurality of channels in said periphery, each channel being bounded by an at least partially arcuate surface and each extending from said end and diminishing in cross-sectional area in a direction toward and terminating at said head.

3. A valve comprising a head having a side; and a stem at said side of and coaxially connected with the head, said stem having a coaxial boss adjacent to the head, the boss having an end distant from said head, a periphery, and a plurality of channels in said periphery, said channels being of different configurations and each channel extending from said end toward and terminating at said head, the cross-sectional area of at least that portion of each channel which is adjacent to said head diminishing gradually in a direction toward the head.

4. A valve comprising a discoid head having a side and a cylindrical portion of smaller diameter at said side, said portion having a peripheral zone and a plurality of cut outs of small cross-sectional areas extending inwardly from said peripheral zone; and a stem coaxial with and having a boss connected to said cylindrical portion, the boss having an end distant from said cylindrical portion, a periphery, and a plurality of channels in said periphery, each channel extending from said end toward and terminating at said cylindrical portion, each communicating with one of said cutouts, and each having a cross-sectional area gradually increasing in a direction away from said cylindrical portion.

5. A valve comprising a head having a side; a stem coaxially connected to and extending from the side of said head; and a tubular flow restricting member coaxially surrounding said stem and connected to the side of said head, said member having an end distinct from the head and a plurality of channels extending from said end toward and terminating at said head, the channels dividing said member into a plurality of sections and the area of at least that zone of each channel which is close to the head increasing gradually in a direction toward said end.

6. In a valve assembly, in combination: a valve housing having a bore; and a valve comprising a head having a side turned toward and a diameter greater than that of said bore, the head being movable between a position of sealing contact with and a position at a distance from said housing in which positions the valve is fully closed and open, respectively, and a stem extending into said bore and having a coaxial boss connected with said head for reciprocating same, said boss constituting a flow restricting member and having a diameter greater than that of said stem but smaller than that of said bore and being formed with a plurality of asymmetrically distributed peripheral channels each having an open end communicating with said bore at the end of said boss distant from the head and each terminating at a point close to said head, the cross-sectional area of at least that zone of each channel which is close to said head diminishing in a direction toward said head to permit progressively increasing flow of a fluid from said bore when the valve is moved from its closed toward its fully open position.

7. In a valve assembly, in combination: a valve housing having a bore; and a valve comprising a head having a side turned toward and a diameter greater than that of said bore, the head being movable between a position of sealing contact with and a position at a distance from said housing in which positions the valve is fully closed and open, respectively, and a stem extending into said bore and having a coaxial boss connected with said head for reciprocating same, said boss constituting a flow restricting member and having a diameter greater than that of said stem but smaller than that of said bore and being formed with a plurality of helically convoluted peripheral channels each having an open end communicating with said bore at the end of said boss distant from the head and each terminating at said head, the cross-sectional area of at least that zone of each channel which is close to said head diminishing in a direction toward said head to permit progressively increasing flow of a fluid from said bore when the valve is moved from its closed toward its fully open position.

8. In a valve assembly, in combination: a valve housing having a bore and a seat at one end of said bore; and a valve comprising a head having a sealing face and movable between a position of sealing contact beween said seat and said face and a position at a distance from said housing in which positions the valve is fully closed and open, respectively, a cylindrical portion connected with said head and slidably received in said bore when the valve is closed, said portion having a plurality of peripheral cutouts of small cross-sectional areas, and a stem extending into said bore and having a boss coaxial with and of a diameter equal to the diameter of said cylindrical portion, the boss having a periphery received with a slight play in said bore when the valve is closed, a first end distant from said head and a second end connected with said cylindrical portion, the periphery of said boss being formed with a plurality of channels, one for each of said cutouts, each channel having an open end at the first end of said boss in communication with said bore and extending toward and terminating at the second end of said boss in communication with one of said cutouts, the cross-sectional areas of said channels increasing gradually in a direction away from said head at least in those zones thereof which are closer to said cylindrical portion.

References Cited in the file of this patent

UNITED STATES PATENTS

| | | |
|---|---|---|
| 723,409 | Rowley | Mar. 24, 1903 |
| 892,994 | Johnston | July 14, 1908 |
| 1,418,911 | Garlick | June 6, 1922 |
| 2,612,840 | Laseley | Oct. 7, 1952 |